(12) United States Patent
Kube et al.

(10) Patent No.: US 6,276,219 B1
(45) Date of Patent: Aug. 21, 2001

(54) MOTION CONTROLLER FOR A MOTOR-DRIVEN, POLE-CONDUCTED TRANSPORTATION TRUCK OR TROLLEY

(75) Inventors: Matthias Kube, Herborn; Ralf Baginski, Neetze; Nikolaus Eggert, Hamburg, all of (DE)

(73) Assignee: Jung Heinrich AG, Hamburg (DE)

( * ) Notice: Subject to any disclaimer, the term of this patent is extended or adjusted under 35 U.S.C. 154(b) by 0 days.

(21) Appl. No.: 09/248,427

(22) Filed: Feb. 11, 1999

Related U.S. Application Data

(63) Continuation-in-part of application No. 08/807,099, filed on Feb. 27, 1997.

(30) Foreign Application Priority Data

Mar. 1, 1996 (DE) .............................................. 198 07 976

(51) Int. Cl.[7] ....................................................... G01L 1/26
(52) U.S. Cl. ...................................................... 73/862.391
(58) Field of Search ...................... 73/862.391, 862.541, 73/862.57; 364/571.101; 323/94; 267/140.5; 180/6.5

(56) References Cited

U.S. PATENT DOCUMENTS

| | | | |
|---|---|---|---|
| 3,364,417 | * | 1/1968 | Norton et al. .......................... 323/94 |
| 4,931,967 | * | 6/1990 | Boe et al. ........................ 364/571.01 |
| 5,487,533 | * | 1/1996 | Kurita et al. ....................... 267/140.5 |

* cited by examiner

Primary Examiner—Benjamin R. Fuller
Assistant Examiner—Jewel V. Thompson
(74) Attorney, Agent, or Firm—Vidas, Arrett, Steinkraus P.A.

(57) ABSTRACT

A motion controller for a motor-driven transportation truck or trolley with a steering pole that can be swivelled about a horizontal axis attached to a steering shaft or a steering frame and is provided with means for setting the direction of motion and the speed, characterized in that the steering pole is equipped with a sensor means providing an output signal that depends not only on the magnitude of the force applied to the steering pole, but also on whether this force is a push or a pull, and that the system also comprises a feed back controller unit that sets and/or regulates the speed and the direction of rotation of the driving motor according to this output signal.

8 Claims, 3 Drawing Sheets

MOTION CONTROLLER FOR A MOTOR-DRIVEN, POLE-CONDUCTED TRANSPORTATION TRUCK OR TROLLEY

CROSS-REFERENCE TO RELATED APPLICATIONS

This application is a Continuation-in-part of co-pending application Ser. No. 08/807,099, filed Feb. 27, 1997 the entire contents of which are hereby incorporated by reference.

STATEMENT REGARDING FEDERALLY SPONSORED RESEARCH

Not Applicable

BACKGROUND OF THE INVENTION

The present invention relates to a motion controller for a motor-driven transportation truck or trolley designed for an accompanying operator who controls it by means of a steering pole.

An accompanied transportation truck or trolley with steering pole is known, for example, from DE 12 39 573. The steering pole is pivoted around a horizontal axis attached to a steering frame and can be swivelled between a vertical position, in which the brake is simultaneously operated by means of an appropriate device, and a lower position— displaced through a vertical angle with respect to the first—in which the vehicle becomes capable of being steered and operated. An appropriate control unit arranged at the free end of the steering pole is provided for the travel and loading operations. It comprises, among others, a travel switch or controller such that the direction in which it is moved determines the direction of travel, while the distance through which it is moved simultaneously determines the traveling speed of the truck or trolley.

It is also known from DE 27 51 333 that the steering pole can be arranged at the upper end of a steering shaft that, passing through the housing of the driving unit, extends vertically downwards to a frame or support for the steering wheel, which in most cases is also driven by a motor. In connection with steering poles of this type it is also known that they can be swivelled through a certain distance about a horizontal axis, so that, with the help of the pole, the truck or trolley can also be steered and operated from a (driving) position on the vehicle itself.

DE 27 54 102 made known a steering pole for such accompanied low-slung truck or trolleys that is designed in such a way that the pole can be shortened without any substantial reduction of its resistance and with the control unit remaining at substantially the same level, where the extent of the shortening may correspond to the entire length of the pole. This arrangement excludes that the operator, when swivelling the control unit inwards, i.e. in the direction of the truck or trolley, will flip the pole upwards into a position in which the safety switch becomes laid bare or that the control unit at the end of the pole is swivelled through such a distance that the lever of the safety switch is swivelled out of its contact position.

DE 38 32 581 revealed a steering pole. for this type of truck or trolley in which traveling direction and speed switches are arranged in the control unit, together with a safety switch, the later on the front face. When the free end of the pole comes up against some resistance, which may also be due to its coming into contact with the operator, the emergency safety switch will immediately bring the brake into action, so that the operator cannot be run over by the vehicle.

From DE 37 16 375 there is known a motor-driven truck or trolley steered by means of a pole in which this pole, for the purpose of controlling the motor, is fitted with a switch-operating device that may be actuated in any arbitrary manner, the said device being situated in the vicinity of the handle at the end of the pole. For this purpose the handle, together with the end of the pole, may be arranged in such a manner as to permit it to be displaced with respect to the rest of the pole, complete with an appropriate device to sense the direction of the displacement and thus determine (set) the direction of motion of the vehicle. This arrangement is intended to make sure that whenever the pole is either picked up from its lowered position or lowered from its raised position, the various components that control the vehicle drive will not be inadvertently actuated when the operator gets hold of the handle and thus set the truck or trolley in motion.

The present invention sets out to solve the problem of a motion controller for a motor-driven transportation truck or trolley with steering pole that will give the accompanying operator a "direct" feeling for the vehicle without the distracting need for operating a motion switch.

The invention is based on the insight that the rotation path of a motion switch of the type normally used changes as a function of the swivel path of the steering pole. When operating the vehicle, the operator must always transform the desired vehicle performance into a rotary motion of his own hand. This becomes a disadvantage in particularly critical situations when the operator, rather than actuating the motion switch and reversing the direction of motion, tries to brake the rolling vehicle by either "holding" it or "pushing" it away.

The solution in accordance with the present invention comprises a sensor means that will produce a signal as a function of both the direction of the tractive force applied to the steering pole, i.e. push or pull, and the magnitude of that force, through a feed back controller unit that will set the direction of rotation and the speed of the motor driving the vehicle in accordance with the said signal.

When the steering pole of the accompanied vehicle is designed in accordance with the present invention, it becomes possible to convey to the operator a feeling similar to the one associated with a pole-steered truck or trolley devoid of a driving motor. The sensor means determines the pulling and/or pushing forces that the operator exerts on the steering pole and transforms them into a setting signal suitable for the motion controller. The feed back controller unit evaluates both the direction and the strength of the signal and then sends appropriately amplified signals to the driving motor. The invention thus creates a feed back controller unit that can be designed in such a way so as to make it possible to regulate tensile and compressive forces as a function of the load, the force and the speed at an ergonomically "comfortable" level.

With a view to preventing stumbling and the operator being run over by the vehicle, the maximum speed of such low-slung truck or trolleys is limited by [German] law to 6 km/hr. As previously mentioned, it is therefore known that an emergency switch can be fitted to the steering pole that will prevent the operator becoming trapped between an obstacle and the vehicle. The motion controller in accordance with the present invention does not require a separate emergency switch, because—for example—a rearward motion of the truck or trolley against the operator will cause the sensor means to reverse the direction of motion and prevent the operator being run over.

There are many possible ways in which the sensor means can be applied. In accordance with one version of the invention, one of these consists of using it to determine the force acting between the steering pole and the truck or trolley.

One version of the said sensor means is provided with a guide way that will cause it to respond only to tensile or compressive forces acting in the longitudinal direction of the steering pole and permit displacements only within this guide way, displacements that act proportionally on a signal transmitter (potentiometer, DMS, Hall sensor, etc.) This signal transmitter then sends a signal proportional to the tensile or compressive force to the feed back controller unit. The feed back controller unit then sets or regulates the motor in accordance with the direction and magnitude of the signal, so that the vehicle can reduce the pulling or pushing force exerted by the operator. We thus have a closed loop regulator circuit.

The properties of the regulator circuit can be realized either mechanically in the sensor or electronically in the controller. As far as the operator is concerned, these properties are the adjustability of the load dependencies, the tensile or compressive force, and the speed dependency. The response behavior and the power level can likewise be determined in this manner.

Mechanically these properties are obtained in the sensor by means of purposeful design of a bias force around the rest position. The use of defined friction can likewise take account of the aforementioned possibilities.

Electronically, again, the influencing of the system by the operator can take the form of a "modification" of characteristic curves stored in the controller. These characteristic curves represent a relationship between two parameters. In the case under consideration the parameter pairs could be tensile force and speed, tensile force and load, or speed and load.

As a result of the unique drive system and associated steering pole described herein, the present invention creates a unique motion controller based on a feed back controller unit, not merely a controller wherein the motor is engaged in proportion to the deflection of a handle as in many prior motion controller systems. A common problem with earlier motion controllers is motor oscillations wherein the motor accelerates or decelerates alternatingly. The present invention avoids this problem by providing a regulator circuit that accounts for the desired speed of the vehicle as well as for the load placed on the vehicle relative to the proportional force the vehicle operator applies to the control handle or pole.

DETAILED DESCRIPTION OF THE INVENTION

Figure 1:
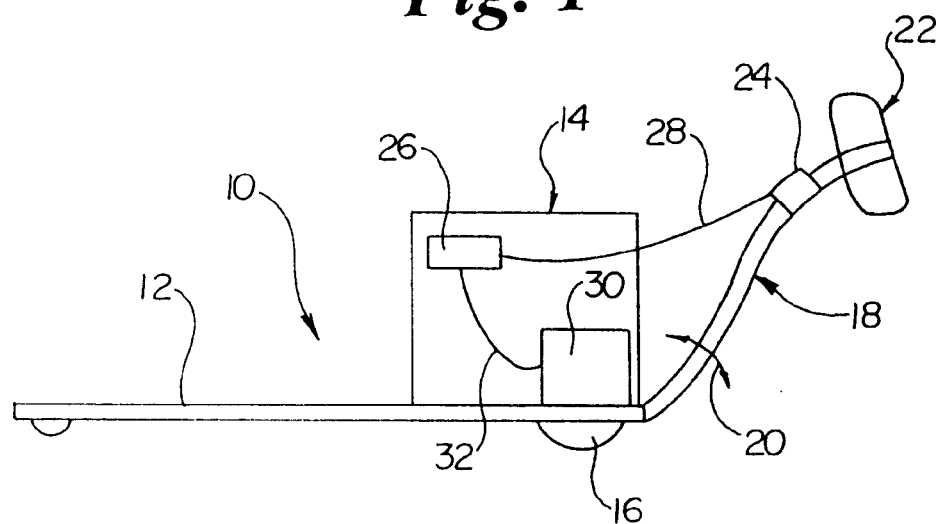
FIG. 1 shows a transportation truck or trolley with a motion controller according to the invention in a highly schematic form.

As can be seen in FIG. 1, 10 designates a low-slung transportation truck or trolley that consists of a part 12 to accommodate the load and a part 14 containing the driving components. A drive wheel 16 is supported in a swivelling frame and is driven by a motor 30 that could be, for example, an electric motor fed by a rechargeable battery.

The swivelling frame is connected to a steering pole 18 that, in its turn, can be swivelled about a horizontal axis, as is suggested on the drawing by the double-headed arrow 20.

At its free end the steering pole carries a terminal unit or handle 22 that is provided with, for example, operating buttons or the like for raising and lowering the steering pole itself.

The steering pole 18 is further provided with a sensor means 24 that measures the force with which an operator either pulls the steering pole 18 or uses it to push the truck or trolley. The output signal of the sensor means is transmitted to a feed back controller unit 26 in the part 14 containing the driving components, which can be done, for example, via an appropriate lead 28. The feed back controller unit 26 transforms the sign and the magnitude of the signal received from the sensor means 24 into a setting signal for the driving motor 30, the said setting signal being passed to the motor 30 via a second electric lead 32.

Figure 2:
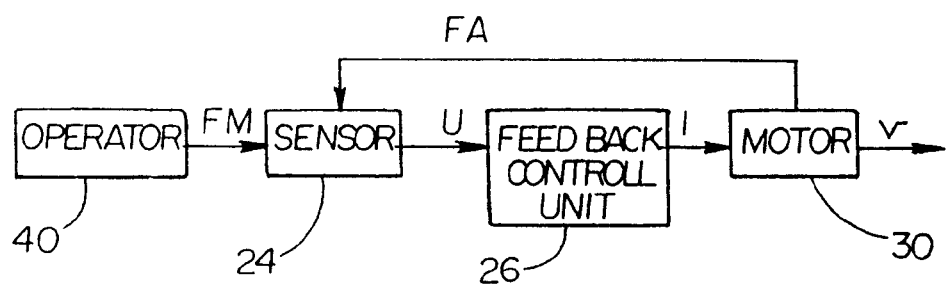
FIG. 2 is a block diagram of a regulator circuit for a motion controller in accordance with the invention.

Turning to FIG. 2, the block 40 represents the operator who exerts a force FM on the steering pole. Sensor means 24 measures this force and produces a control voltage U that, upon being applied to the feed back controller unit 26, generates a current I for the driving motor 30, which then propels the truck or trolley with a speed v. As shown by the figure, the motor force FA is also applied to the sensor 24, which will thus form the mean of the two forces.

With the help of the sensor means 24, the motor 30 is thus operated as a function of the operator-applied force. The overall effect is that of a tracker-type power steering that conveys to the operator the same feeling or impression that he would have if he were pulling or pushing a truck or trolley without a drive of its own. The feed back controller unit 26 can evaluate the sensor signal in accordance with a given algorithm in order to obtain the desired shift in the output of the driving motor. This algorithm may already be realized in the sensor means itself, in which case the latter will transform the signal, originally depending only on the operator's force input, into an appropriate signal for the feed back controller unit.

The illustrated arrangements permit an ergonomic operation of the steering pole. Somewhat similarly to the case of power-assisted steering, one can thus obtain power-assisted traction, where the start-up—according to individual preferences—can be either natural or appropriately softened.

In an emergency situation, moreover, rapid reversal of the direction of motion being a case in point, it would be possible to activate a brake that will immediately bring the vehicle to a halt. Another possibility is that of arranging matters in such a way as to enable the operator to set the pull or push required to attain a particular speed.

Over and above this, it would be possible to realize the traction behavior in such a manner as to render it substantially independent of the loading state of the truck or trolley.

A speed-dependent pulling force can likewise be taken into account by means of an appropriate speed signal in the feed back controller unit, thereby producing an optimal motion sensation.

In all of the embodiments described within this application the regulator circuit is controlled and maintained by the feed back controller unit or units. The feed back controller unit 26 contains software associated with drive components 14. It provides the suitable setting signal which controls the motor such that the force at the handle has a desired or set value. Accordingly, the feed back controller unit tries to compensate for the force of the operator by the drive of the trolley. In other words, the feed back controller unit tries to bring the force applied at the steering pole 18 and detected by sensor means 24 to zero or to a comfortable level. The desired or set value of the force to be controlled can depend upon the speed of the trolley.

The feed back controller unit fulfills this task through a continuous comparison of the magnitudes of the desired or set value and the measured force at the sensor means and by a corresponding treatment through mathematical functions. The feed back controller unit calculates from the difference between the desired and the actual value and the time depending course thereof, the necessary torque of the drive motor or the necessary braking torque of the drive motor.

The feed back controller unit may include proportional, integral or differentiated portions. In the system of the inventors, a combination of proportional and differentiated portions are selected. This, however, is a conventional technique. Without a differentiated portion an oscillating behavior will occur. The force effecting on the handle will oscillate around the set value. This problem enhances with increasing driving power.

The differentiating portion can eliminate this problem in that it reacts "early". Mathematically expressed the controller can be as follows:

$$x(t) = K\left[e(t) + T\frac{de(t)}{dt}\right]$$

Wherein,
x(t) is the set signal
K is a proportional constant
e(t) is the control error
T is the time constant.

Figure 3:
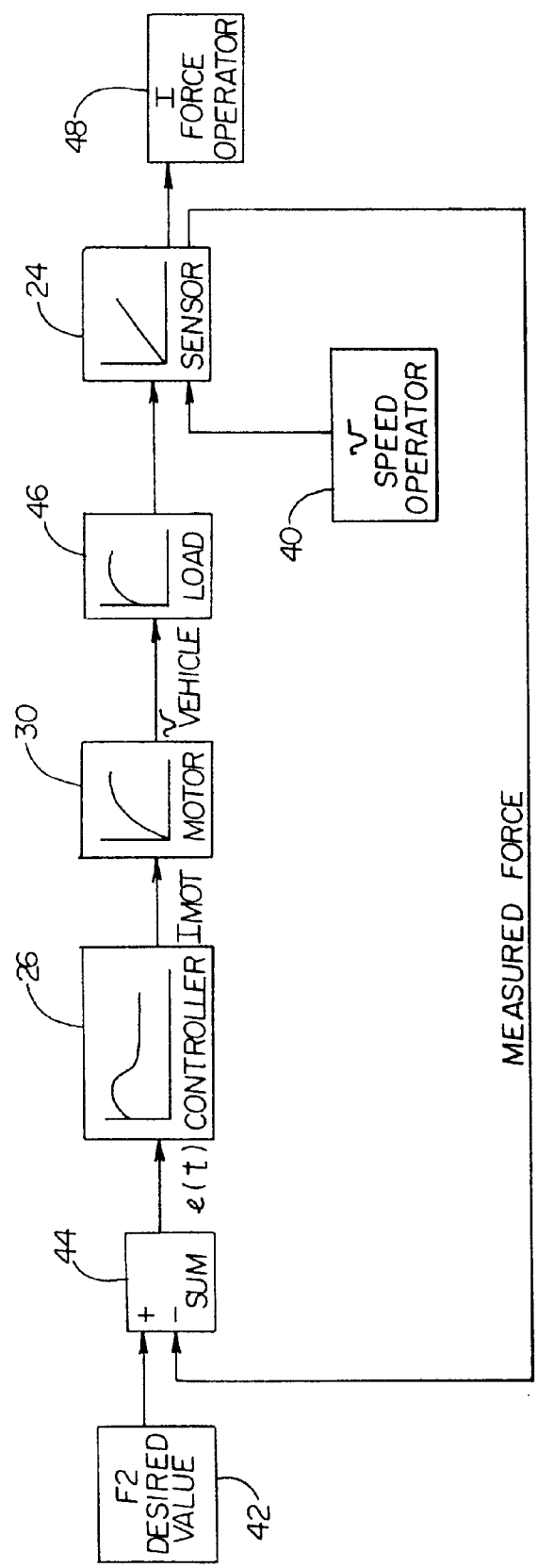
FIG. 3 is more detailed block diagram of a first embodiment of a regulator circuit for a motion controller.

Such control can be depicted as a block diagram as shown in FIG. 3.

With such a control, the control of the force at the pole is achieved principally and all feedbacks to the operator can be generated. In order to achieve a comfortable feeling for the operator, it may be desirable to hold the forces at a low level so as to give the operator the feel that he or she is handling a small vehicle.

On the other hand it may be of some benefit to give the operator the feeling that he operates a load with a certain speed. This can be achieved by influencing the desired value in dependance of the load and/or speed.

Referring now to FIG. 3, a more detailed block diagram of a first embodiment of a regulator circuit for a motion controller is shown in which the set value, which represents the current output of sensor 24, is shown at 42. A difference signal or control error signal e(t) is produced at 44, which is a time varying signal which represents the difference between the set value and the measured force as sensed by sensor 24 and output to 44. Because both the measured force and set value each have a sign and magnitude, e(t) has both a sign and magnitude, which is input to controller 26, which generates the current $I_{mot}$ for the driving motor 30. The force FA is compensated at 46 based on the load on the vehicle, which is determined based on the torque of the motor 30. Force FA is then input to sensor 24 along with the actual force FM applied to the steering pole by the operator 40. Sensor 24 calculates the mean of FA and FM and outputs the mean force to block 48, which is a device for altering the apparent resistance for moving the steering pole 18. The mean force output to block 48 also becomes the set value 42 on the next cycle of the feed back loop. Therefore, it can be seen that the system is continuously changing the torque to the motor based on the position of the steering pole 18 and also the force felt by the operator when moving the steering pole, based on the load.

For example, if the vehicle is moving at a set velocity and a heavier load is on the vehicle, as determined by the torque of the motor, then FA will be adjusted so that the steering pole 18 is harder to move than when the load is very light.

Figure 4:
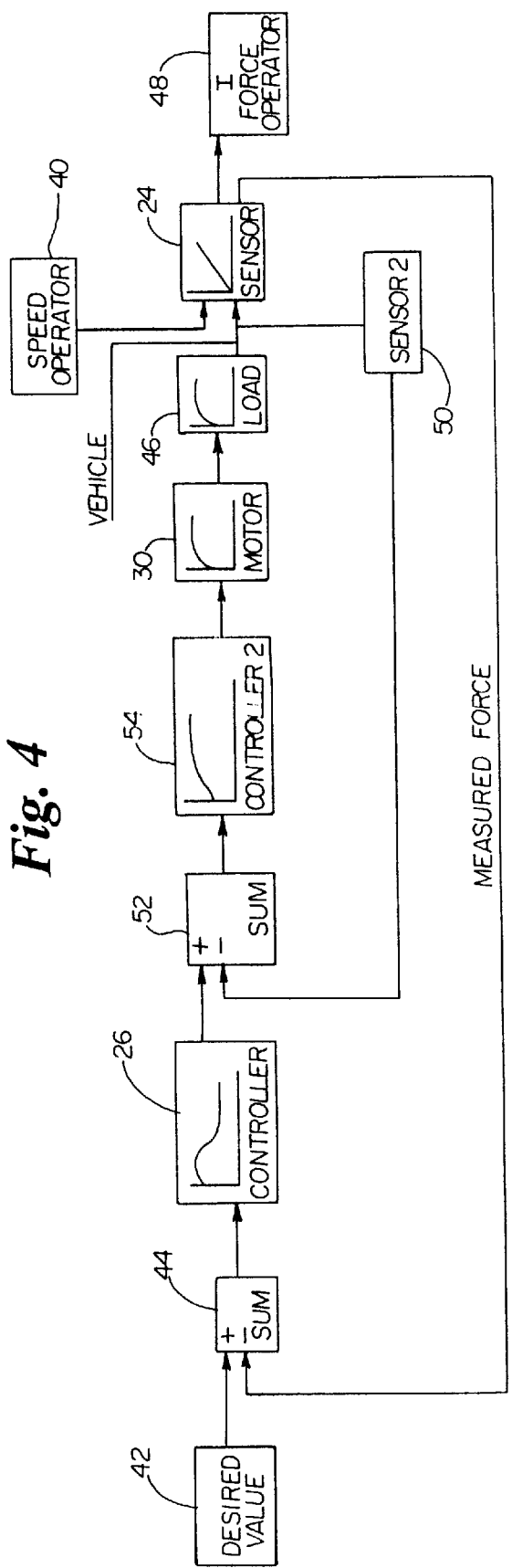
FIG. 4 is a more detailed block diagram of a second embodiment of a regulator circuit for a motion controller.

FIG. 4 shows an alternate embodiment of the regulator circuit, which is identical to FIG. 3 discussed above, with the addition of a second feedback loop to control the velocity of the vehicle. The second feed back loop consists of a second sensor 50 which senses the velocity of the vehicle and outputs a signal corresponding to velocity which is input to block 44, which produces a difference signal based on the actual velocity output by second sensor 50 and the set velocity as output by feed back controller unit 26. Therefore, by adding a second feed back controller unit 54 and control loop into the regulator circuit the operator has a high degree of control over the cart's speed regardless of the load placed thereupon.

In the first embodiment of FIG. 3, if the load suddenly was reduced and the steering pole maintained in its current position, the vehicle would increase in speed rapidly because the torque on the engine would be the same, but the vehicle would be lighter. The embodiment of FIG. 4 prevents this by separately controlling the velocity with its own feed back loop, so that if the load were to suddenly decrease, the torque to the motor would be decrease to maintain the set velocity.

It will be understood that this disclosure, in many respects, is only illustrative. Changes may be made in details, particularly in matters of shape, size, material, means of attachment, and arrangement of parts without exceeding the scope of the invention. Accordingly, the scope of the invention is as defined in the language of the appended claims.

What is claimed is:

1. A motion controller for a trolley driven by an electric motor, the trolley having a steering pole linked to the trolley to be swivelled about a horizontal axis and attached to a steering shaft or a steering frame of the trolley, the trolley constructed and arranged to carry a predetermined load, the motion controller constructed and arranged to provide the trolley with a predetermined speed and direction, the controller comprising:

a) sensor means which measures a force between the pole and the trolley, the sensor means generating a signal which is proportional to the force measured, the signal having a predetermined value, the predetermined value of the signal depending on whether a pushing or a pulling force is detected by said sensor means, the signal being transmitted to a first summing circuit, wherein the signal is compared with a first desired value for the force to generate a first summing signal;

b) a first feed back controller unit which receives the first summing signal and generates a first setting signal the first setting signal being transmitted to a second summing circuit;

c) a speed measuring means which generates a speed signal proportional to a predetermined speed of the trolley, the speed signal being transmitted to the second summing circuit to generate a second summing signal; and d) a second feed back controller unit which receives the second summing signal and generates a second setting signal to be transmitted to the motor the sensor means being in electronic communication with the first feed back controller unit, the speed measuring means being in electronic communication with the second feed back controller unit, the first feed back controller unit and the second feed back controller unit being operatively engaged to the motor.

2. The motion controller of claim 1, wherein the steering pole has a free end, the free end of the steering pole is provided with a handle that can be moved in order to direct the steering pole, and the sensor means further characterized to measure the force acting between the handle and the steering pole.

3. The motion controller of claim 1, wherein the signal is a function of the predetermined load or is wholly independent of the predetermined load.

4. The motion controller of claim 1, wherein in the signal is a function of the predetermined speed.

5. The motion controller of claim 1, wherein in the signal is modulated electronically in the feed back controller unit as a function of a signal proportional to the predetermined load or the predetermined speed of the trolley.

6. The motion controller of claim 3, wherein the signals are transferred mechanically to the sensor means.

7. The motion controller of claim 1, wherein the steering pole is subject to a springing means that tends to bring the steering pole into a neutral operating position.

8. The motion controller of claim 1, wherein said feed back controller unit generates the setting signal for the speed or a rate of turn of the motor, the motion controller further comprising an additional feed back controller unit which generates the setting signal for the motor by measuring the speed or rate of turn.

* * * * *

UNITED STATES PATENT AND TRADEMARK OFFICE
CERTIFICATE OF CORRECTION

PATENT NO.     : 6,276,219 B1
DATED          : August 21, 2001
INVENTOR(S)    : Kube, Baginski and Eggert It is certified that error appears in the above-identified patent and that said Letters Patent is hereby corrected as shown below:

<u>Title page,</u>
Item [73], delete "Jung Heinrich AG" and insert -- Jungheinrich AG --

Signed and Sealed this

Fourth Day of June, 2002

Attest:

Attesting Officer

JAMES E. ROGAN
Director of the United States Patent and Trademark Office